May 26, 1964 F. L. OPPENHEIMER ETAL 3,134,425
GAS GENERATION SYSTEM AND METERING VALVE MECHANISM
Filed Feb. 8, 1961 2 Sheets-Sheet 1
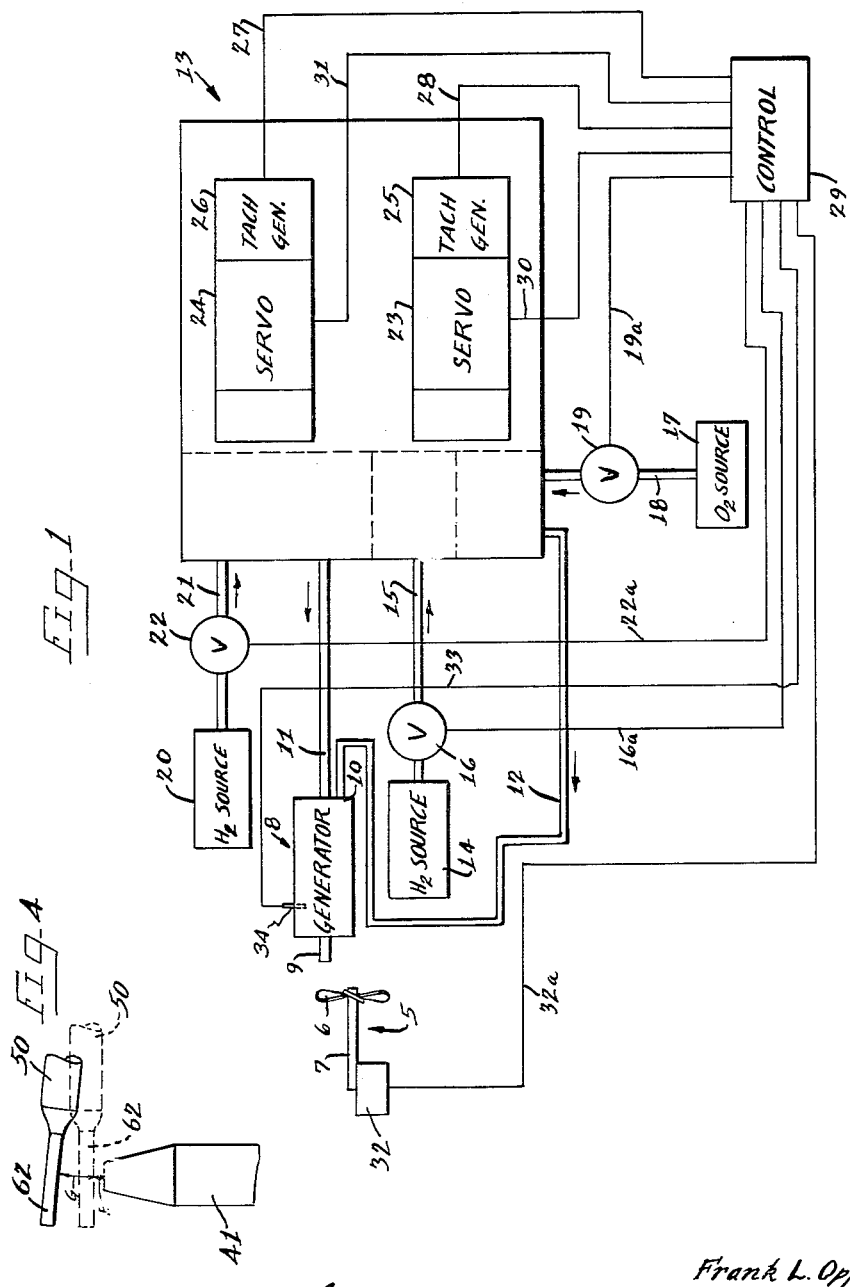
INVENTORS
Frank L. Oppenheimer
BY Robert S. Mathias
ATTORNEYS May 26, 1964  F. L. OPPENHEIMER ETAL  3,134,425
GAS GENERATION SYSTEM AND METERING VALVE MECHANISM
Filed Feb. 8, 1961  2 Sheets-Sheet 2
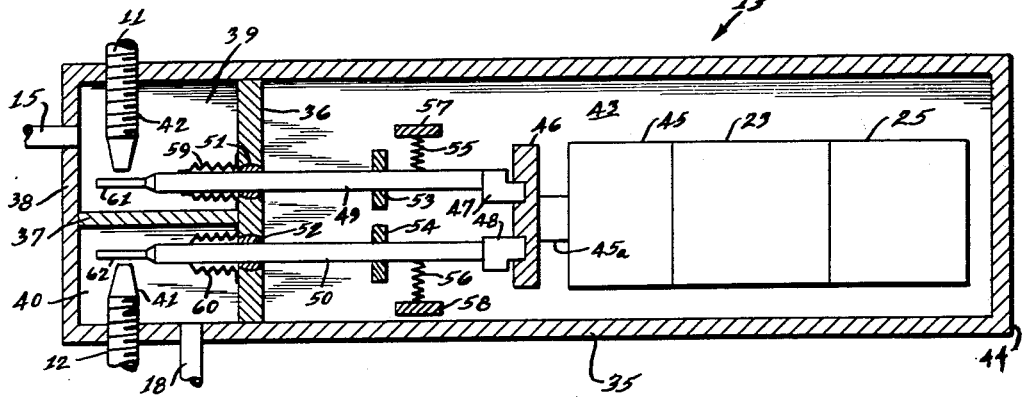
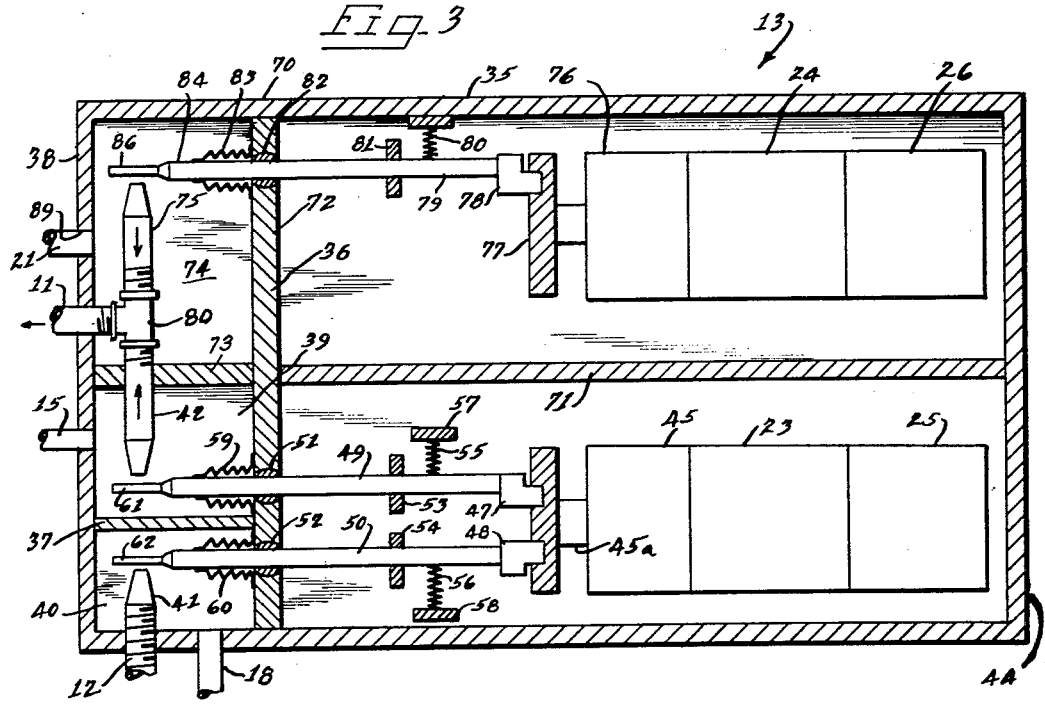
INVENTORS
Frank L. Oppenheimer
By Robert S. Mathias
ATTORNEYS United States Patent Office 3,134,425
Patented May 26, 1964

3,134,425
GAS GENERATION SYSTEM AND METERING
VALVE MECHANISM
Frank L. Oppenheimer, University Heights, and Robert S. Mathias, Willoughby, Ohio, assignors to Thompson Ramo Wooldridge Inc., Cleveland, Ohio, a corporation of Ohio
Filed Feb. 8, 1961, Ser. No. 87,812
3 Claims. (Cl. 158—99)

This invention relates to rockets, missiles and the like and is more particularly directed to improved method and means for controlling flow of fluid to gas generators employed for operation of auxiliary components of air and space borne vehicles.

Difficulty has been encountered in the past in controlling total mass flow of gas to auxiliary components of rockets, missiles and the like, for example, gas generators, under both steady state and transient operating conditions. Of particular interest was the design of control mechanisms for gas generators wherein temperature conditions were a primary factor. Flow to gas generators, which were designed to operate turbines employed for driving pumps associated with the fuel feed mechanisms for reaction motors, for example, had to be controlled within critical limits to assure that the flow of fuel to the reaction motor was maintained within desired fuel flow rate limits so that the thrust produced by the reaction motor was at a level sufficient to assure that the vehicle, such as a rocket or missile, maintained its timing on a programed trajectory.

Heretofore, gas generators employed for operation of turbines of such auxiliary rocket or missile components were of the liquid type. That is, liquid fuel and oxidizer components of bi-propellants were metered into the gas generator to produce the gaseous products of reaction which in turn were discharged against the blades of the turbine for rotation thereof. Since the oxidizer and fuel component of the bi-propellants were required to be concisely metered in reaction proportions in order to produce gases flowing through the discharge nozzle and impinging on the turbine blades at a steady rate in order to assure that the propellant pumps for the reaction motors operated at a steady state level, metering of the liquid oxidizer and fuel components of the bi-propellant was a critical parameter.

By employment of our invention wherein gaseous reactants are utilized, thereby eliminating the flow problems of liquid reactants, we provide simple and effective means for controlling total mass flow of the gases to a gas generator both under steady state and transient operation conditions.

A further feature of the present invention is the provision of means for controlling gas generator temperature within close steady state limits.

It is therefore an object of the present invention to provide improved auxiliary gas generation systems for missiles, rockets and the like.

Another object of the present invention is to provide auxiliary gas generation systems utilizing gaseous reactants and flow rate control mechanisms for the gaseous reactants which are substantially unaffected by temperature differences of the reactants.

Another object of the present invention is to provide control means for metering gas flow to a gas generator both under steady state and transient operating conditions.

A further object of the present invention is to provide improved metering valve means for regulating flow of gaseous reactants to a gas generator.

A still further object of the present invention is to provide improved metering means for controlling flow rate and temperature of gaseous reactants flowing to a gas generator.

Another object of the present invention is to provide an improved method for controlling the flow rate of gaseous reactants to a gas generator which may include the feature of controlling temperature of one or both of the gaseous reactants.

These and other objects, features and advantages of the present invention will become apparent from a careful consideration of the following detailed description, when considered in conjunction with the accompanying drawing illustrating preferred embodiments of the present invention and wherein like reference numerals and characters refer to like and corresponding parts throughout the several views.

On the drawings:

FIGURE 1 is a generally schematic view of a gas generation system constructed in accordance with the present invention;

FIGURE 2 is a view in cross-section of metering means employed in the system shown in FIGURE 1;

FIGURE 3 is an alternative embodiment of metering valve means found useful in the practice of the present invention; and FIGURE 4 is a schematic view illustrating the metering feature of the valve means of FIGURES 2 and 3.

As shown on the drawings:

While the present invention has a variety of applications, for purposes of illustration, the gas generation system of the present invention is shown, in FIGURE 1, as utilized for driving a turbine which may be provided to drive pump means employed for controlling flow of the liquid fuel components of a thrust reaction motor of a missile, rocket, satellite, and the like.

Referring to FIGURE 1 there is shown a turbine, generally indicated by the numeral 5 including a plurality of radial vanes or blades 6 mounted on a turbine shaft 7. Adjacent the turbine 5 is a gas generator, generally indicated by the numeral 8 which is of conventional construction and which has a discharge outlet or conduit 9 positioned for supplying the discharge gases from the generator in impinging relation with the blades 6 of the turbine for rotating the shaft 7 thereof. At the inlet side 10 on the gas generator, a conduit 11 is connected for supplying one of the gaseous reactants to the gas generator. A similar conduit 12 is connected to the gas generator and the wall 10 for supplying the other gaseous reactant to the gas generator.

Conduits 11 and 12 are connected at their opposite ends to fuel metering means, generally indicated by the numeral 13 constructed in accordance with the present invention. A source of one of the gaseous reactants 14 is connected by a conduit 15 to the metering valve means 13 and is provided with a shutoff valve 16. Similarly, the other gaseous reactant is supplied to the metering valve 13 from a source 17 through conduit 18 having a shutoff valve 19 therein.

As aforesaid, temperature control of the gas generator 8 may be provided by increasing or decreasing the quantity of one of the gaseous reactants fed through the metering valve to the gas generator. For this purpose, an additional source 20 of one of the gaseous reactants is connected to the metering valve 13 through a conduit 21 having a shutoff valve 22 therein.

Supported within the metering valve 13 are a pair of servomotors 23 and 24 respectively, each of which has a tachometer generator 25 and 26 coupled thereto. The servomotors 23 and 24 are provided for controlling the metering mechanisms controlling flow rate and temperature, as is more fully discussed hereinafter. The tachometer generators 25 and 26 are provided to produce an output proportional to the velocity of the servomotor shafts (not shown in FIGURE 1), which is fed back through lines 27 and 28 to a control unit 29 for controlling operation of the servomotors 23 and 24 through lines 30 and 31. The control unit 29 may be of any conventional construction, such as that shown in Chapman U.S. Patent No. 2,790,091.

If desired, the control unit 29 may also control opening of the valves 16, 19 and 22 through lines 16a, 19a and 22a.

Control unit 29 may also be connected to a speed senser 32 through line 32a for receiving an indication of the speed of the shaft 7 of the turbine 5. Additionally, the control unit 29 may be connected as by line 33 to a temperature senser element 34 in generator 8 whereby the combustion temperature may be read to thereby control operation of the servomechanism 24. The control unit 29 may control operation of the servomotors 23 and 24 by comparing the signal from the speed senser 32 with a fixed signal or a variable signal received from a remote source, such as the auto-pilot system of the vehicle, such as a missile or rocket, with which the gas generation system is employed and thereby, if an error is sensed in the control unit, the control unit may send a signal to the servomotor 23 to increase or decrease the rate of flow through conduits 11 and 12 thereby increasing or decreasing the rate of flow of the gaseous reactants to the gas generators which in turn increase or decrease the rate of gas discharge and thereby the speed of the shaft 7. Similarly, the control unit 29, in response to the temperature signal received from the temperature senser element 34 in line 11 may compare this signal with a fixed signal indicating the desired temperature level in the line 11 and thereby, if an error is sensed in the control unit 29, actuate the servomotor 24 for increasing or decreasing the amount of one of the gaseous reactants flowing through the line 11 and thereby the temperature in the gas generator. In this manner, the temperature in the gas generator may be maintained at a set steady state level.

Thus, a system for controlling the total mass flow of the gaseous reactants in the gas generator 8 both under steady state and transient operating conditions is provided which may also include the feature of control of the gas generator temperature within close steady state limits.

Referring to FIGURE 2, the details of metering valve means 13 for control of flow of gaseous reactants is shown without the temperature control mechanism.

The valve means 13 include a housing 35 having a divider wall 36 separating the housing into a pair of chambers. A second divider wall 37 connected to the divider wall 36 and end wall 38 of the housing separates the chamber defined thereby into a pair of gas compartments 39 and 40. The conduit 18 for one of the gaseous reactants communicates with the compartment 40 whereas the conduit 15 for the other gaseous reactant communicates with the compartment 39. Thus, means are provided for supplying the gaseous reactant components to the metering valve means 13. It will be appreciated, of course, that the divider wall 37 prevents flow of the gaseous reactant components from one compartment 39 to the other compartment 40 and vice versa.

The outlet conduits for the gaseous reactants, conduits 11 and 12, communicate with the interior of one of the compartments 39 or 40. As shown in FIGURE 2, conduit 12 communicates with compartment 40 and is provided with a nozzle 41 extending partway into the compartment. Similarly, the conduit 11 communicates with the compartment 39 through a nozzle extension 42 extending partway into the compartment 39.

The servomotor 23 and tachometer generator 24 are positioned in the compartment 43 defined by the divider wall 36 and end wall 44 of the housing 35.

The servomotor 23 is of the conventional type having an oscillatory shaft (not shown). The shaft of the servomotor 23 is connected through reduction gearing 45 to an output shaft 45a. The shaft 45a carries at the end thereof a cam member 46.

Retained for riding in the cam groove of the cam member 46 are a pair of spaced cam followers 47 and 48 respectively. Each cam follower 47 and 48 has secured thereto a lever arm 49 and 50 respectively which may be fulcrumed in a uniball bearing 51 and 52 respectively or other suitable pivot point mounted in the divider wall 36. Each lever arm 49 and 50 may also be provided with a guide 53 and 54 and spring means 55 and 56 secured to uprights 57 and 58 may be provided to act on the respective levers 49 and 50 for minimizing backlash of the cam followers during operation.

Each lever 49 and 50 extends into the respective compartments 39 and 40 through bellow seal means 59 and 60 which may be secured to the divider wall 36 and lever arm.

Attached to the end of each of the lever arms 49 and 50 in the compartments 39 and 40 are flapper members 61 and 62 respectively. The flapper members 61 and 62 are substantially flat plates of uniform cross-section and sized to the effective cross-sectional flow areas of the nozzle inlets of nozzles 41 and 42. The flapper members 61 and 62 are spaced from the nozzles 41 and 42 a distance G (FIGURE 4). The arms 49 and 50 move relative to each other so that when the flapper nozzle 61 is moved closer to the nozzle inlet 42, the flapper 62 is moved closer to the nozzle inlet 41 and vice versa. The distance "G" will thus be determined by the performance requirements of the gas generator 8. Thus, in accordance with the requirements of the gas generator, the flappers 61 and 62 may be positioned at an equal gap distance "G" from their respective nozzle inlets or the spacing of the flappers may be varied, dependent upon each nozzle and flapper linkage relation.

It will be observed that the flapper is fulcrumed in such a manner that the movement of the flapper towards and from the nozzle is perpendicular to the axis of the bellows, for example bellows 60. FIGURE 4 illustrates such movement. Movement, therefore, of the flapper away from the nozzle inlet from the equilibrium position "E" will permit greater flow through the nozzle whereas movement of the flapper from the equilibrium position towards the nozzle will, by reducing the gap distance "G" decrease the rate of flow through the nozzle 41. Similarly movement of the flapper 61 will cause corresponding increase or decrease in the flow rate through the nozzle 42. Thus, means are provided for varying the rate of mass flow of the two gaseous reactants to the generator 8.

A feature of the present invention includes the mechanical linking feature of the speed control flapper valves 61 and 62 for metering flow of the two gaseous reactants simultaneously through employment of a single cam to limit large temperature extremes which may occur as a result of surges of either of the gaseous reactants into the valve chambers 39 and 40 as a result of possible failure of the actuation mechanism of either valve 61 or 62. The effect of pressure surges may be compensated for in the chambers 39 and 40 thereby preventing these pressure forces from acting in the gas generator chamber and affecting operation of the turbine 5. The fulcrum arrangements 51 and 52 prevent unbalanced pressure forces which may result from large increases of flow of the gaseous reactants into the chamber from affecting operation of the generator.

In operation, the control unit 29 would be actuated by a remote signal to open valves 16 and 19 to permit flow of the gaseous reactants, such as hydrogen ($H_2$) and oxygen ($O_2$) into the respective chambers 39 and 40 through the conduits 15 and 18. The flappers 61 and 62 will be positioned from the inlets of the nozzles 41 and 42 in such a manner that their relative spacing assures the proper steady state flow rate required for operation of the gas generator at a desired performance level. The hydrogen would flow from chamber 39 through the nozzled conduit 11 into the gas generator whereas the oxygen gas in chamber 40 would flow through the nozzle 41 through conduit 12 into the gas generator in reaction proportions whereby the hot gas generated would be discharged through the discharge conduit 9 against the turbine blades 6. The shaft 7 of the turbine would be rotated and a signal be derived therefrom by the speed senser 32 which is fed back through line 32a to the control unit 29. The signal received from the turbine shaft speed senser 32 by the control unit 29 will be fed to a comparator (not shown) in the control unit where it will be compared with the fixed signal or variable signal indicating the desired speed level required for the shaft 7. If the actual speed of the shaft 7 is within the desired fixed or variable limits, the servomotor 23 will not be actuated. However, if a greater or less speed is indicated in the control unit 29, an error signal will be sent from the control unit 29 to the servomotor 23 for rotation of the cam 46 in the desired direction to thereby move the flappers 61 and 62 with relation to the inlets of the nozzles 41 and 42 to increase or decrease relatively the rate of flow through the nozzles to the gas generator. The tachometer generator 25 will relay a signal feedback to the control unit 29 which will compare the actual angle of movement. If the signals are equal, the control unit will terminate transmission of a signal through line 30 to the servomotor and maintain the shaft in the desired position. If the angle of movement of the servomotor shaft is greater or less than desired, the control unit 29 will increase the angle of movement of the servo shaft or actuate movement of the shaft to reduce the previous angle of rotation. Thus the rate of flow to the gas generator will be increased or decreased accordingly. The increase or decrease will be sensed by the speed senser 32 which in turn will relay the signal through line 32a to the control unit. If the later signal received indicates that the speed of the shaft 7 is now within the desired limits, the servo motor movement is terminated and the servo motor shaft returned to the position wherein the flappers 61 and 62 are in the equilibrium position. Thus, simple and effective means are provided for maintaining the output of a gas generator at a predetermined level and thereby maintaining the operation of the turbine at a constant speed.

If it is desired to employ a temperature compensating feature whereby the temperature of the gas generator is maintained relatively constant, the apparatus shown in FIGURE 3 may be employed. In this arrangement, the servo motor 23 and associated components, the flapper valves 61 and 62 and their associated components, and the inlet and outlet conduits for the hydrogen and oxygen gas chambers 39 and 40 are employed. This structure is identical in operation and function as above described in connection with FIGURE 2.

In the arrangement shown in FIGURE 3, the housing of the metering valve means 13 includes an outer wall 70, a divider wall 71 separating the housing 35 into a pair of compartments, and the divider wall 36. The divider wall 36 has an extension 72. The divider wall 73 cooperates with the wall 72 and end wall 38 of the housing to define a chamber 74. Connected to the outlet 11 and communicating with the nozzle portion 42 thereof is a nozzled conduit 75. A servo motor 24, tachometer generator 26 and gear reduction mechanism 76 is connected to a cam 77. Cam 77 is provided with a cam follower 78 which in turn is connected to the lever arm 79 biased as by spring 80 in the guide 81. The lever arm 79 is fulcrumed in a uniball bearing 82 mounted in the divider wall 72 and passes through bellows means 83 secured to wall 72. At its end 84 adjacent the nozzle 75 the lever arm 79 carries a flapper valve member 86. The flapper is similar in construction to flapper 61 and is spaced and sized with respect to the inlet of the nozzle 75 to control the flow of gas into the nozzle.

An inlet 89 communicates the conduit 21 with the chamber 74 for supplying hydrogen ($H_2$) gas to the chamber 74 from the source 20 through the valve 22.

Thus, where a temperature compensating mechanism is employed as appears in FIGURE 3, the relative spacing of the flapper 86 and flapper 61 is such that the total means flow to the mixing T connection 80 and outlet 11 from chambers 74 and 39 is in reaction proportion with the flow of the other gaseous reactant, oxygen ($O_2$) to the gas generator. If the temperature sensitive element 34 sends a signal to the control unit 29 indicating that the temperature in the gas generator 8 is greater or less than the predetermined desired temperature, the control unit will thereby actuate the servomotor 24 for moving the flapper 86 in the desired direction relative to the inlet of the nozzle 75 to thereby increase or decrease the amount of hydrogen gas fed to the supply conduit 11 thereby regulating the gas generator temperature. The tachometer generator 26 operates in a manner similar to the tachometer generator 25 and indicates in the control unit 29 the angle of movement of the shaft of the servomotor 24 to thereby control operation of the temperature compensating mechanism. The temperature sensitive member 34 will then indicate a rise or lowering of the temperature in gas generator 8 and relay a signal through the line 33 to the control unit indicating whether the temperature is now at the desired level for purposes of activating or de-activating the servomotor 24 to increase or decrease the rate of flow through the nozzle 75. It will be understood that the temperature of the hydrogen ($H_2$) gas in the source 20 and the source 14, and the temperature of the oxygen ($O_2$) gas in the source 17 may vary, but the temperature in the gas generator will be maintained at a constant steady state level.

It will thus be appreciated that with our invention we provide means for eliminating the metering problems associated with small quantity flows of liquid reactants. Similarly, by linking the speed control flapper valves 61 and 62 mechanically to a single cam we provide means for preventing large temperature variations in a gas generator as well as means for controlling the relative rates of flow of two gas reactants to a gas generator.

Although various minor modifications might be suggested by those versed in the art, it will be understood that we wish to embody within the scope of the patent warranted hereon all such embodiments as reasonably and properly come within the scope of our contribution to the art.

We claim as our invention:

1. A device adapted to meter the flow rates of gas comprising:
    a first chamber having an inlet and nozzled outlet for transfer of a gaseous medium,
    a second chamber having an inlet and nozzled outlet for transfer of a gaseous medium,
    a lever in each of the first and second chambers carrying a flapper member in the chamber positioned adjacent and spaced from the nozzled outlet,
    pivot means in which the lever is fulcrumed mounted on one wall of the chamber,
    guide means for the lever,
    a single cam member,
    a cam follower on the end of each elever opposite the flapper member riding in spaced relation in a cammed surface of the single cam member, and
    means mounting the cam member for rotational movement thereof in response to a signal received from a remote source whereby movement of the cam member simultaneously moves the cam followers and proportionately varies the distance between the flapper members and nozzled outlets in the first and second chambers to thereby vary proportionately the relative rates of flow from said chambers.

2. A device adapted to meter the flow rates of gases to a gas generator comprising:

a first chamber having an inlet and nozzled outlet for transfer of a gaseous medium to the gas generator,
a second chamber having an inlet and nozzled outlet for transfer of a gaseous medium to the gas generator,
a lever in each of the first and second chambers carrying a flapper member in the chamber positioned adjacent and spaced from the nozzled outlet,
pivot means in which the levers are fulcrumed mounted on one wall of the chambers,
guide means for the levers,
a single cam member,
a cam follower on the end of each lever opposite the flapper member riding in spaced relation in a cammed surface of the single cam member,
means mounting the cam member for rotational movement thereof in response to a signal received from a remote source whereby movement of the cam member simultaneously moves the cam followers and proportionately varies the distance between the flapper members and nozzled outlets in the first and second chambers to thereby vary proportionately the relative rates of flow from said chambers,
a third chamber having an inlet and nozzled outlet for transferring gaseous mediums of temperatures equal to and different than the temperature of one of the gaseous mediums in the first and second chambers for combination with one of said gaseous mediums to thereby regulate the gas generator combustion temperature, and
signal responsive means in said third chamber varying the rate of flow from said third chamber through said nozzled outlet in response to a signal received from a remote source.

3. A device adapted to meter the flow rates of gases comprising:
a first chamber having an inlet and nozzled outlet for transfer of a gaseous medium,
a second chamber having an inlet and nozzled outlet for transfer of a gaseous medium,
a lever in each of the first and second chambers carrying a flapper member in the chamber positioned adjacent and spaced from the nozzled outlet,
pivot means in which the lever is fulcrumed mounted on one wall of the chamber,
guide means for the lever,
a single cam member,
a cam follower on the end of each lever opposite the flapper member riding in spaced relation in a cammed surface of the single cam member,
a servomotor having a rotatable shaft connected thereto,
means mounting the cam member for rotational movement on said servomotor shaft,
a tachometer generator connected to said servomotor to produce an output proportional to the velocity of the servomotor shaft, and
means to control said servomotor and tachometer generator to rotate said servomotor shaft in response to a signal received from a remote source whereby movement of the cam member simultaneously moves the cam followers and proportionately varies the distance between the flapper members and nozzled outlets in the first and second chambers to thereby vary proportionately the relative rates of flow from said chambers.

References Cited in the file of this patent

UNITED STATES PATENTS

| 2,606,420 | Moore | Aug. 12, 1952 |
| 2,631,426 | Jewett | Mar. 17, 1953 |
| 2,846,846 | Mock | Aug. 12, 1958 |
| 2,857,741 | Evers | Oct. 28, 1958 |
| 2,995,008 | Fox | Aug. 8, 1961 |
| 3,025,669 | Fischoff | Mar. 10, 1962 |

FOREIGN PATENTS

| 843,535 | Great Britain | Aug. 4, 1960 |